United States Patent Office 3,474,125
Patented Oct. 21, 1969

3,474,125
ESTERS OF POLYHALOPOLYHYDROPOLY-CYCLICDICARBOXYLIC ACIDS AND A METHOD FOR THE PREPARATION THEREOF
Henryk A. Cyba, Evanston, Ill., assignor to Universal Oil Products Company, Des Plaines, Ill., a corporation of Delaware
No Drawing. Filed Sept. 6, 1966, Ser. No. 577,179
Int. Cl. C07c 69/74
U.S. Cl. 260—468                                4 Claims

ABSTRACT OF THE DISCLOSURE

Hydroxy esters of polyhalohydropolycyclicdicarboxylic acids and polyols prepared in the presence of organo tin catalysts.

---

This invention relates to novel compositions of matter which comprise hydroxy esters of polyhalopolyhydropolycyclicdicarboxylic acids and to a method for the preparation thereof. More particularly, the invention is concerned with novel compositions of matter which are prepared by esterifying polyhalopolyhydropolycyclicdicarboxylic acids in the presence of certain catalytic compositions of matter.

The esters of the aforementioned acids which are prepared according to the process of this invention and which comprise novel compositions of matter, are useful as intermediates in the preparation of certain polymeric compositions of matter such as polyurethanes to give finished products which possess many desirable physical characteristics. Furthermore, it is also contemplated that the esters of the present invention may be formulated with other polyols and unsaturated dibasic acids to give polyesters which may then be cured or cross-linked to give finished products also possessing the desirable physical characteristics among which is a high degree of fire retardance. By utilizing the catalytic compositions of matter which are hereinafter set forth in greater detail to prepare the desired material, it is possible to obtain these esters in a high degree of purity and a high yield whereby the products will be subject to less decomposition and less breakdown in color. In addition, the catalysts which are used to effect the esterification reaction will also act as catalysts for polymerization and as stabilizers thereby eliminating the necessity for removing the catalyst before proceeding to the next step in the sequence of reactions which are necessary to prepare a finished product.

It is therefore an object of this invention to prepare novel compositions of matter comprising esters of polyhalopolyhydropolycyclicdicarboxylic acids.

Another object of this invention is to provide a novel process utilizing certain catalytic compositions of matter to esterify polyhalopolyhydropolycyclicdicarboxylic acids to obtain esters in a high yield, said esters possessing high purity.

In one aspect, an embodiment of this invention resides in a compound having the formula:

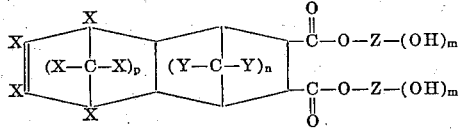

in which X is selected from the group consisting of halogen, hydrogen and an alkyl radical of from 1 to 10 carbon atoms at least two X's being halogen, Y is selected from the group consisting of hydrogen, halogen and alkyl radicals containing from 1 to 10 carbon atoms, Z is selected from the group consisting of mono-functional monohydroxy, poly-functional polyhydroxy and poly-functional polyether residues, $m$ is an integer of from 1 to 7, $p$ is an integer of from 1 to 4 and $n$ ranges from 0 to 4.

A specific embodiment of this invention is found in the bis(polypropylene polyether glycol) ester of 5,6,7,8,9,9-hexachloro - 1,2,3,4,4a,5,8,8a - octahydro - 5,8 - methano-2,3-naphthalenedicarboxylic acid.

Yet another embodiment of this invention is found in a process for preparing a compound having the formula:

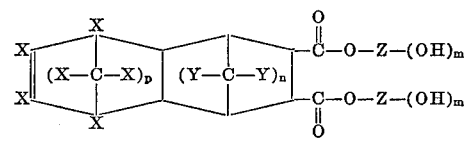

in which X is selected from the group consisting of halogen, hydrogen and an alkyl radical of from 1 to 10 carbon atoms at least two X's being halogen, Y is selected from the group consisting of hydrogen, halogen and alkyl radicals containing from 1 to 10 carbon atoms, Z is selected from the group consisting of mono-functional monohydroxy, poly-functional polyhydroxy and polyfunctional polyether residues, $m$ is an integer of from 1 to 7, $p$ is an integer of from 1 to 4 and $n$ ranges from 0 to 4 which comprises condensing a polyhalopolyhydropolycyclicdicarboxylic acid or anhydride with a polyol in the presence of a catalyst comprising an organo tin compound such as tin octoate at a temperature in the range of from about 125° to about 250° C. and recovering the resultant ester.

Other objects and embodiments will be found in the following further detailed description of this invention.

As hereinbefore set forth, the present invention is concerned with novel compositions of matter comprising esters of polyhalopolyhydropolycyclicdicarboxylic acids or anhydrides which are prepared by condensing an acid or an anhydride of a type hereinafter set forth in greater detail with a polyol in the presence of an organo tin catalyst at condensation conditions. The particular type of acid which is utilized may be designated as a polyhalopolyhydroalkanonaphthalenedicarboxylic acid. A particularly preferred acid or anhydride thereof may be prepared by the Diels-Alder condensation of a conjugated aliphatic diene with an olefinic dicarboxylic acid or anhydride and the resultant cyclohexene dicarboxylic acid or anhydride is further condensed with a halocycloalkadiene. A particular example of this reaction is the Diels-Alder condensation of 1,3-butadiene with maleic acid to form 1,2,3,6-tetrahydrophthalic acid, followed by the Diels-Alder condensation with hexachlorocyclopentadiene to form the resultant product, namely, 5,6,7,8,9,9 - hexachloro - 1,2,3,4,4a,5,8,8a - actahydro - 5,8-methano - 2,3 - naphthalenedicarboxylic acid. It is to be understood that the corresponding anhydride may be prepared utilizing maleic anhydride as the starting material in place of maleic acid. Other conjugated aromatic dienes which may be used include, for example, 2-methyl-1,3 - butadiene, 1,3 - butadiene, 1,3 - hexadiene, 2,4 - hexadiene, 2,3 - dimethyl - 1,3 - butadiene, 1,3 - heptadiene, 2,4 - heptadiene, conjugated octadienes, nonadienes, etc., halo-dienes, as for example, chloroprene and particularly 1-chloro-1,3 - butadiene and 1,4 - dichloro-1,3-butadiene, etc. Similarly, other unsaturated dicarboxylic acids may be used including fumaric acid, itaconic acid, citraconic acid, glutaconic acid, masaconic acid, etc. Also, other halo-cycloalkadienes may be used including, for example, 1,2 - dichlorocyclopentadiene, 1,5 - dichlorocyclopentadiene, 1,2,3-trichlorocyclopentadiene, 1,2,3,4-tetrachlorocyclopentadiene, 1,2,3,4,5 - pentachlorocyclodiene and similar compounds in which all or part of the chlorine is replaced by another halogen, and particularly bromine.

Still another preferred polyhalopolyhydroalkanonaphthalenedicarboxylic acid or anhydride thereof is prepared by condensing cyclopentadiene with maleic acid or maleic anhydride to form norborn-5-ene-2,3-dicarboxylic acid or anhydride and thereafter condensing this compound with hexachlorocyclopentadiene. This product may be named 5,6,7,8,9,9 - hexachloro - 1,2,3,4,4a,5,8,8a - octahydro - 1,4,5,8 - dimethano - 2,3 - naphthalenedicarboxylic acid or anhydride. Here again, it is to be understood that other conjugated cyclo aliphatic dienes, other unpolyhalocycloalkadienes may be used to prepare suitable and similar polyhalopolyhydroalkanonaphthalenedicarboxylic acids or anhydrides.

From the above, it will be seen that any suitable polyhalopolyhydroalkanonaphthalenedicarboxylic acids or anhydrides may be used in accordance with the present invention. These acids may be illustrated by the following generic formula:

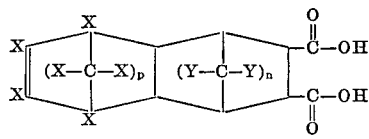

in which X is selected from the group consisting of halogen, and particularly chlorine and/or bromine, hydrogen and an alkyl radical of from 1 to 10 and preferably of from 1 to 4 carbon atoms, at least two of the X's being halogen, Y is seletced from the group consisting of halogen, hydrogen and an alkyl radical of from 1 to 10 and preferably of from 1 to 4 carbon atoms, $n$ ranges from 0 to 5 and $p$ is an integer of from 1 to 4.

For example, referring to the above structure, when X is chlorine, $p$ is 1 and $n$ is 0, the compound is 5,6,7,8, 9,9 - hexachloro-1,2,3,4,4a,5,8,8a-octahydro-5,8-methano-2,3 - naphthalenedicarboxylic acid or the corresponding anhydride. Also, when X is chlorine, Y is hydrogen, $p$ is 1 and $n$ is 1, the compound is 5,6,7,8,9,9-hexachloro-1,2,3,4,4a,5,8,8a - octahydro - 1,4,5,8 - dimethano - 2,3-naphthalene - dicarboxylic acid or the corresponding anhydride. While above two specifically named acids are representative of the class of acids or anhydrides which may be used, it is contemplated within the scope of this invention that other halogenated acids or anhydrides such as polybromo-substituted acids may be utilized as starting materials in the process of the present invention.

As hereinbefore set forth, the acid or anhydride is condensed with a polyol to form the desired ester. These esters may be either mono-esters or poly-esters depending upon the mole ratio of the acid or anhydride to the polyol in the reaction mixture. For example, when the di-esters are desired, the polyol which is to be reacted with the acid or anhydride is present in a mole ratio of 2:1 moles or more of polyol per mole of acid or anhydride. Examples of polyols which may be condensed with the aforementioned acids include alkylene glycols such as ethylene glycol, propylene glycol, butylene glycol, amylene glycol, hexylene glycol, heptylene glycol, etc.; glycol ethers such as beta,beta-dihydroxy-propyl ether, dihydroxydipropyl ether dihydroxydibutyl-ether, polyethylene polyether glycol, polypropylene polyether glycol, polybutylene polyether glycol, etc., triols such as glycerin, 1,2,6-hexanetriol, trimethylolmethane, trimethylolethane, trimethylolpropane, trimethylolbutane, trimethylolpentane, trimethylolhexane, trimethylolheptane, etc., tetraols such as pentaerythritol, etc. In addition, other polyols which may be used include the reaction products of pentaerythritol with ethylene oxide, pentaerythritol with propylene oxide, pentaerythritol with butylene oxide, etc., the reaction products of ethylene oxide, propylene oxide, butylene oxide, etc., with the aforementioned glycerin, 1,2,6-hexanetriol, pentaerythritol, etc. to give the corresponding polyethylene polyether glycols of glycerin, the polyethylene polyether glycol of hexanetriol, the polyethylene polyether glycol of pentaerythritol, the polypropylene polyether glycol of glycerin, etc. It is also contemplated within the scope of this invention that aromatic polyols such as catechol, hydroquinone, resorcinol, hydroxy hydroquinone, pyrogallol, phluroglucinol, 1,4-dihydroxymethylbenzene, etc., may also be used, although not necessarily with equivalent results.

As hereinbefore set forth, the novel compositions of matter of the present invention are condensed in the presence of an organo tin catalyst to form said compounds which possess the desirable physical characteristics of being less susceptible to decomposition as well as being lighter in color, said lightness remaining after an extended period of time. Examples of organo tin catalysts which are used in this process comprise compounds resulting from the reaction of tin with a monobasic acid containing from 1 to about 20 carbon atoms in length. Specific examples of these organo tin catalysts include stannous diacetate, stannous dipropionate, stannous dibutyrate, stannous dioctoate, stannous didecanoate, stannous dioleate, stannous distearate, stannous dilaurate, etc.; dialkyl tin salts such as dibutyl tin diacetate, dibutyl tin dipropionate, dibutyl tin dibutyrate, dibutyl tin dioctoate, butyl tin didecanoate, dibutyl tin dioleate, dibutyl tin dilaurate, dibutyl tin distearate, etc., trialkyl tin salts such as tributyl tin acetate, tributyl tin propionate, etc., triaryl tin salts such as triphenyl tin acetate, triphenyl tin octoate, etc. It is also contemplated within the scope of this invention that halogen substituted tetravalent tin derivatives may be used such as diphenyl tin dichloride, butyl tin trichloride, dilauryl tin dichloride, dimethyl tin dichloride, phenyl tin trichloride, triphenyl tin chloride, dibenzyl tin dichloride, tribenzyl tin chloride, etc., but not necessarily with equivalent results. The stannous salts which do not contain a halogen substituent constitute the preferred catalyst of the present invention due to the fact that the resultant products, when utilizing a tin salt which does not contain a halogen substituent are lighter colored, are of a higher purity and can be prepared at a higher rate of esterification with no adverse effect on the resultant polyurethane foams or any other products which are prepared with the aforementioned glycol ethers of polyhalopolyhydropolycyclicdicarboxylic acids. In addition, the catalysts which do not contain halogen will be lower in cost inasmuch as said catalyst will remain in the finished product. It is also understood that the stannous salts of monobasic acids which are used as catalysts in the present invention may be stabilized with antioxidants or inhibitors which are well known in the art such as tert-butylcatechol, butylated hydroxy toluene or any other alkylated phenolic or polyphenolic type of compound.

The condensation of the acid or anhydride of the type hereinbefore set forth with the polyol is effected at condensation conditions which include a temperature in the range of from about 125° C. to about 250° C. and preferably in a range of from about 180° to about 210° C. In addition, the reaction or condensation is usually effected at a pressure ranging from sub-atmospheric up to atmospheric. If so desired, the reaction may be effected in the presence of substantially inert organic solvents which possess the property of being utilized as water azeotropic agents. Some examples of these solvents which may be used include the xylenes, cumene, diethylbenzene, cymene, tetrahydronaphthalene, decahydronaphthalene, etc. However, in the preferred embodiment of this invention, the process is effected at sub-atmospheric pressures so that a vacuum may be applied to remove the water of esterification which forms during the condensation. In addition, it is also preferred to effect the condensation in the absence of air, said condensation taking place under a blanket of an inert gas such as nitrogen. Stirring is applied in the above process to increase the rate of the reaction, and control the composition of the product. The process of this invention may be effected in any suitable manner and may comprise either a batch or continuous type operation. For example, when a batch type operation is used, a quantity of the acid or anhydride of the type hereinbefore set forth, along with the particular polyol is placed in an appropriate apparatus, which contains an organo tin catalyst of the type hereinbefore set forth, said apparatus depending upon the reaction is effected in the presence of a solvent of the type hereinbefore set forth, or whether the reaction should be effected under sub-atmospheric conditions. The vessel and contents thereof are then heated to the reaction temperature, mechanical operation is started and allowed to proceed for a predetermined period of time, the water which is liberated during the condensation reaction being removed during the reaction, either azeotropically by use of the solvent or by the application of a vacuum. Upon completion of the desired residence time, the vessel and contents thereof are allowed to cool to room temperature and the desired ester is recovered by conventional means such as fractional distillation, crystallization, etc.

It is also contemplated that the process of the present invention may be effected in a continuous manner of operation. When such a type of operation is used, a quantity of the acid or anhydride and a quantity of the polyol in a mole ratio previously determined are continuously charged to a reaction vessel containing the desired organo tin catalyst and which is maintained at the proper operating conditions of temperature and pressure. If the reaction is to be effected in the presence of a solvent, the solvent may be continuously charged to the reaction vessel through a separate line or if so desired, said solvent may be admixed with one or both of the starting materials prior to entry into the mixture and the resulting mixture charged thereto in a single stream. After completion of the desired residence time, the reactor effluent is continuously withdrawn and passed to a separation zone wherein the desired esters are separated from any unreacted starting materials and/or undesired side reaction products. The desired product is passed to storage after purification while any unreacted starting materials are separated from the unreacted side reaction products and recycled to form a portion of the feed stock.

Examples of esters of polyhalo-substituted polyhydroalkanonaphthalenedicarboxylic acids which may be prepared according to the process of this invention include the bis-(polypropylene polyether glycol) ester of 5,6,7,8,9,9-hexachloro-1,2,3,4,4a,5,8,8a - octahydro-5,8-methano-2,3-naphthalenedicarboxylic acid, bis-(polybutylene polyether glycol) ester of 5,6,7,8,9,9-hexachloro-1,2,3,4,4a,5,8,8a - octahydro-5,8-methano-2,3-naphthalenedicarboxylic acid, bis-(polyamylene polyether glycol) ester of 5,6,7,8,9,9-hexachloro-1,2,3,4,4a,5,8,8a - octahydro-5,8-methano-2,3-naphthalenedicarboxylic acid, bis-(polychloromethylethylene polyether glycol) ester of 5,6,7,8,9,9-hexachloro-1,2,3,4,4a,5,8,8a, - octahydro - 5,8 - methano-2,3-naphthalenedicarboxylic acid, bis-(polyoxypolyethylsorbityl) ester of 5,6,7,8,9,9 - hexachloro-1,2,3,4,4a,5,8,8a-octahydro-5,8-methano-2,3-naphthalenedicarboxylic acid, bis-(polyoxypolybutylsorbityl) ester of 5,6,7,8,9,9-hexachloro-1,2,3,4,4a,5,8,8a - octahydro-5,8-methano-2,3-naphthalenedicarboxylic acid, bis-(polyoxypolypropylsorbityl) ester of 5,6,7,8,9,9 - hexachloro-1,2,3,4,4a,5,8,8a-octahydro-5,8-methano-2,3-naphthalenedicarboxylic acid, bis-(polyoxypolyethylhexityl) ester of 5,6,7,8,9,9-hexachloro-1,2,3,4,4a,5,8,8a - octahydro-5,8-methano-2,3-naphthalenedicarboxylic acid, bis-(polyoxypolypropylhexityl) ester of 5,6,7,8,9,9-hexachloro - 1,2,3,4,4a,5,8,8a-octahydro-5,8-methano-2,3-naphthalenedicarboxylic acid, bis-(polyoxypolybutylhexityl) ester of 5,6,7,8,9,9-hexachloro-1,2,3,4,4a,5,8,8a-octahydro-5,8-methano-2,3-naphthalenedicarboxylic acid, bis-(polypropylene polyether glycol) ester of 5,6,7,8,9,9-hexachloro-1,2,3,4,4a,5,8,8a-octahydro-1,4,5,8-dimethano-2,3-naphthalenedicarboxylic acid, bis-(polybutylene polyether glycol) ester of 5,6,7,8,9,9-hexachloro-1,2,3,4,4a,5,8,8a-octahydro-1,4,5,8-dimethano - 2,3 - naphthalenedicarboxylic acid, bis-(polyamylene polyether glycol) ester of 5,6,7,8,9,9-hexachloro - 1,2,3,4,4a,5,8,8a - octahydro-1,4,5,8-methano-2,3-naphthalenedicarboxylic acid, bis-(polychloromethylethylene polyether glycol) ester of 5,6,7,8,9,9-hexachloro-1,2,3,4,4a,5,8,8a-octahydro - 1,4,5,8 - dimethano-2,3-naphthalenedicarboxylic acid, bis - (polyoxypolyethylsorbityl) ester of 5,6,7,8,9,9-hexachloro-1,2,3,4,4a,5,8,8a - octahydro-1,4,5,8-dimethano-2,3-naphthalenedicarboxylic acid, bis-(polyoxypolybutylsorbityl)ester of 5,6,7,8,9,9-hexachloro - 1,2,3,4,4a,5,8,8a - octahydro-1,4,5,8-dimethano - 2,3 - naphthalenedicarboxylic acid, bis-(polyoxypolypropylsorbityl) ester of 5,6,7,8,9,9 - hexachloro-1,2,3,4,4a,5,8,8a - octahydro-1,4,5,8-dimethano-2,3-naphthalenedicarboxylic acid, bis-(polyoxypolyethylhexityl) ester of 5,6,7,8,9,9-hexachloro - 1,2,3,4,4a,5,8,8a - octahydro-1,4,5,8-dimethano-2,3-naphthalene-dicarboxylic acid, bis-(polyoxypolypropylhexityl) ester of 5,6,7,8,9,9-hexachloro-1,2,3,4,4a,5,8,8a - octahydro - 1,4,5,8 - dimethano-2,3-naphthalenedicarboxylic acid, bis-(polyoxypolybutylhexityl) ester of 5,6,7,8,9,9-hexachloro-1,2,3,4,4a,5,8,8a-octahydro-1,4,5,8-dimethano - 2,3 - naphthalenedicarboxylic acid, etc. It is also contemplated within the scope of this invention that bromo-substituted counterparts of the aforementioned acids may also be prepared.

The following examples are given to illustrate the process of the present invention which, however, are not intended to limit the generally broad scope of the present invention in strict accordance therewith.

EXAMPLE I

In this example, 21.25 g. (0.05 mole of 5,6,7,8,9,9-hexachloro - 1,2,3,4,4a,5,8,8a-octahydro-5,8-methano-2,3-naphthalenedicarboxylic acid along with 102.5 (0.1 mole) of a polyol comprising polypropylene polyether glycol which has a molecular weight of from 975 to 1075, an average hydroxyl number of 110 and containing primary hydroxyls, and 0.63 g. of a catalyst comprising tin dioctoate were placed in a flask along with 115 cc. of xylene. The flask was provided with stirring means and a Dean-Stark water trap. The flask was heated to a temperature of about 150° C. and maintained in a range of from 149° to 153° C. for a period of about 6 hours. During this time, the xylene was distilled out to raise the reflux temperature which then went to approximately 190° C. for an additional period of 14 hours. During this time, the water of condensation was azeotroped off and recovered in the Dean-Stark water trap. At the end of this time, the flask and contents thereof were allowed to cool to room temperature and the desired bis-(polypropylene polyether glycol) ester of 5,6,7,8,9,9-hexachloro-1,2,3,4, 4a,5,8,8a-octahydro-5,8-methano - 2,3 - naphthalenedicarboxylic acid which was light amber in color was recovered.

EXAMPLE II

In this example, 42.5 g. (0.1 mole) of 5,6,7,8,9,9-hexachloro - 1,2,3,4,4a,5,8,8a-octahydro-5,8-methano-2,3-naphthalenedicarboxylic acid, 262 g. (0.2 mole) of a polypropylene polyether glycol having an average molecular weight of 1200 and containing secondary hydroxyl groups and secondary carbon atoms, and 1.52 g. of a catalyst comprising tin dioctoate were placed in a flask provided with heating means, a nitrogen introduction tube and an exit tube. The flask was heated to a temperature of 187° C., purged with nitrogen and maintained thereat for a period of about 22 hours. During this time, a water pump vacuum which created a pressure of 30 mm. of mercury was used to remove the water of condensation which formed during the reaction. At the end of the aforementioned residence time, the desired product comprising the bis-(polypropylene polyether glycol) ester of 5,6,7,8,9,9 - hexachloro-1,2,3,4,4a,5,8,8a-octahydro-5,8-methano-2,3-naphthalenedicarboxylic acid in the form of an amber viscous liquid was recovered. The product had a hydroxyl color value, meq./g. of 0.7 and final acid value, meq./cc. of 0.03.

EXAMPLE III

In this example, 182.8 g. (0.43 mole) of 5,6,7,8,9,9- hexachloro-1,2,3,4,4a,5,8,8a-octahydro-5,8-methano - 2,3-naphthalenedicarboxylic acid, 848 g. (0.86 mole) of polypropylene polyether glycol and 5.15 g. of a catalyst comprising tin dioctoate having the same properties as the glycol set forth in Example I above were placed in a flask similar in construction to that set forth in Example II above. The temperature was raised to about 205° C. and maintained thereat for a period of about 4 hours, during which time the water of condensation which formed was removed by means of a water-pump vacuum. At the end of the desired residence time, the resultant bis-(polypropylene polyether glycol) ester of 5,6,7,8,9,9-hexachloro-1,2,3,4,4a,5,8,8a-octahydro-5,8-methano - 2,3-naphthalenedicarboxylic acid in the form of a light tan viscous liquid was recovered. The hydroxyl mole equivalent weight of this product was 1276, a hydroxyl value, meq./g. of 0.783 and a final acid value, meq./cc. of 0.01. The product is of the following composition: carbon, 56.89 percent; hydrogen, 8.83 percent; chlorine, 8.5 percent.

EXAMPLE IV

In this example, 42.2 g. (0.1 mole) of 5,6,7,8,9,9-hexachloro-1,2,3,4,4a,5,8,8a-octahydro - 5,8 - methano-2,3-naphthalenedicarboxylic acid, 203.4 (0.2 mole) of polypropylenepolyether glycol of glycerol and 1.23 g. of stannous dioctoate dissolved in 40 g. of xylene were mixed and refluxed in a manner similar to that set forth in Example I above at a temperature in the range of from 204° to 214° C. The reaction is effected while passing a stream of nitrogen through the flask. After 4 hours 2.2 cc. of water was collected in the Dean-Stark condenser along with 35 g. of xylene. The residual xylene was removed under a vacuum of 0.3 mm. pressure and the liquid light amber product was filtered. There was obtained 234 g. of product which contained 8.3% chlorine, had an hydroxyl value of 1.5 meq./g. and a viscosity of 2800 cps. at 25° C.

EXAMPLE V

In this example, 84.4 g. (0.2 mole) of 5,6,7,8,9,9-hexachloro-1,2,3,4,4a,5,8,8a-octahydro - 5,8 - methano-2,3-naphthalenedicarboxylic anhydride were mixed with 583.2 g. (0.4 mole) of a triol prepared by reacting 1,2,6-hexanetriol with propylene oxide and capping with ethylene oxide. The reaction was effected in the presence of 3.34 g. of stannous dioctoate. The mixture was thoroughly admixed, heating was started and a water pump vacuum was applied. After 4 hours of heating at a temperature in the range of from 210 to 215° C. the acidity of the system decreased to 0.01 meq./g. The resultant product comprised 659 g. of a very light amber liquid which contained 6.4% chloride and had an hydroxyl value of 1.1 meq./g. The product comprised a tetrol having a molecular weight of about 3668 and a hydroxyl mole equivalent weight of 917. The viscosity of the product was 3000 cps. at 23.8° C.

EXAMPLE VI

A flask similar in nature to that described in Example I above was charged with 36.8 g. (0.4 mole) of glycerol, 84.4 g. (0.2 mole) of 5,6,7,8,9,9-hexachloro-1,2,3,4,4a, 5,8,8a-octahydro - 5,8 - methano - 2,3 - naphthalenedicarboxylic anhydride and 0.6 g. of stannous dioctoate which was dissolved in 20 g. of xylene. An additional amount of 20 g. of xylene were charged to the flask and the mixture was stirred for 3.5 hours while heating to a temperature of 138° C., followed by an additional 2 hours at a temperature in the range of from about 183 to 202° C. During this time, 5.9 cc. of water was collected in the Dean-Stark condenser. The solidified product which resulted from this reaction was ground to a white powder which had a melting point of 74° C. The product contained 35.2% chlorine and had a hydroxyl value determined by the phthalic anhydride method of 3.3 meq./g.

EXAMPLE VII

A mixture comprising 687 g. (1.5 moles) of polypropylene polyether glycol having an average molecular weight of about 425, 422 g. (1.0 mole) of 5,6,7,8,9,9-hexachloro - 1,2,3,4,4a,5,8,8a - octahydro - 5,8 - methano-2,3-naphthalenedicarboxylic anhydride and 5.5 g. of stannous dioctoate dissolved in 20 cc. of benzene was placed in a flask similar to that utilized in the above examples. The mixture was stirred under a water pump vacuum and heat was applied to the flask. At a temperature of 130° C. a complete solution resulted. After 8 hours of reflux the acid value dropped to 0.075 meq./g. The hydroxyl value of the resulting product which was an amber liquid was 0.92 meq./g. and the viscosity of the liquid at 24.8° C. was 2300 cps.

EXAMPLE VIII

In this example, 0.5 mole of 5,6,7,8,9,9-hexachloro-1,2,3,4,4a,5,8,8a - octahydro - 5,8 - methano - 2,3 - naphthalenedicarboxylic acid and 1.0 mole of polybutylene polyether glycol along with 5 g. of a catalyst comprising tin dioctoate are placed in the flask. The flask is then heated to a temperature of about 200° C. while passing a stream of nitrogen through the flask. While maintaining the temperature of the flask at the aforementioned 200° C. for a period of about 5 hours, the water of condensation which is formed is removed by means of a water pump vacuum. At the end of the desired residence time, the flask and contents thereof are cooled to room temperature and the desired ester comprising the bis-(polybutylene polyether glycol) ester of 5,6,7, 8,9,9-hexachloro - 1,2,3,4,4a,5,8,8a - octahydro-5,8-methano-2,3-naphthalenedicarboxylic acid is recovered as a light amber viscous liquid.

EXAMPLE IX

In this example, 0.5 mole of 5,6,7,8,9,9-hexachloro-1,2,3,4,4a,5,8,8a - octahydro - 5,8 - methano-2,3-naphthalenedicarboxylic acid and 1.0 mole of polychloromethylethylene polyether glycol along with a catalyst comprising tin dioleate are placed in the flask under a blanket of nitrogen gas. The flask is heated to a temperature of about 200° C. and maintained thereat for a period of about 10 hours. During this time, the water of the condensation which is formed is removed by means of a water pump vacuum. At the end of the aforementioned 10 hours, the flask and contents thereof are cooled to room temperature and the desired product comprising the bis-(polychloromethylethylene polyether glycol) ester of 5,6,7,8,9,9 - hexachloro - 1,2,3,4,4a,5,8,8a - octahydro-5,8-methano - 2,3 - naphthalenedicarboxylic acid is recovered.

EXAMPLE X

A mixture of 0.25 mole of 5,6,7,8,9,9-hexachloro-1,2, 3,4,4a,5,8,8a - octahydro - 5,8 - methano - 2,3 - naphthalenedicarboxylic acid, 0.5 mole of polyoxypolyethylsorbitol along with a catalyst comprising tin distearate is placed in a flask which is under a blanket of nitrogen gas. The flask is thereafter heated to a temperature of about 190° C. and maintained thereat for a period of about 10 hours. During this time, the water of condensation which is formed is removed by means of a water pump vacuum. At the end of the 10 hours, the flask and contents thereof are allowed to cool to room temperature and the desired product comprising the bis-(polyoxypolyethylsorbityl) ester of 5,6,7,8,9,9-hexachloro-1,2,3, 4,4a,5,8,8a-octahydro-5,8-methano - 2,3 - naphthalenedicarboxylic acid in the form of a light amber viscous liquid is recovered.

EXAMPLE XI

A mixture of 0.5 mole of 5,6,7,8,9,9-hexachloro-1,2,-3,4,4a5,8,8a-octahydro-5,8-methano - 2,3 - naphthalenedicarboxylic acid, 1.0 mole of polyoxypolyethylhexitol and a catalyst comprising tin dioctoate is treated in a manner similar to that set forth in the above examples. Upon completion of the desired residence time under operating conditions similar to that set forth in the above example the desired produce comprising the bis-(polyoxypolyethylhexityl) ester of 5,6,7,8,9,9-hexachloro-1,2,3,4,-4a,5,8,8a-octahydro-5,8-methano - 2,3 - naphthalenedicarboxylic acid in the form of a viscous liquid is recovered.

While both primary and secondary polyols have been used as illustrations, in the preferred embodiment of the invention, the hydroxyl groups of the polyols should be situated on a primary carbon atom. Thus, if the use of propylene oxide, butylene oxide, pentylene oxide, etc., reaction products with water, trimethylol ethane, trimethylol propane, trimethylol butane, etc., pentaerythritol, sucrose, sorbitol, alpha-glucoside or any other polyol is contemplated, the preferred embodiment is that such hydroxyl groups of the above reaction prducts will be capped with one unit of ethylene oxide. Hydroxyl groups on secondary carbons may also be utilized, although not necessarily with equivalent results.

I claim as my invention:

1. A compound having the formula:

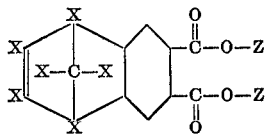

in which X is chlorine, bromine, hydrogen or alkyl of from 1 to 10 carbon atoms, at least two X's being chlorine or bromine, and Z is an ester group derived from polychloromethylethylene polyether glycol or polyoxypolyethylhexitol.

2. A compound having the formula:

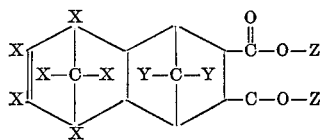

in which X is chlorine, bromine, hydrogen or alkyl of from 1 to 10 carbon atoms, at least two X's being chlorine or bromine, Y is hydrogen, chlorine, bromine or alkyl of from 1 to 10 carbon atoms, and Z is an ester group derived from polypropylene polyether glycol, polybutylene polyether glycol, polychlormethylethylene polyether glycol, polyoxypolyethylsorbitol or polyoxypolyethylhexitol.

3. The compound of claim 1, being the bis-(polychlormethylethylene polyether glycol) ester of 5,6,7,8,9,9-hexachloro-1,2,3,4,4a,5,8,8a-octahydro - 5,8 - methano-2,3-naphthalenedicarboxylic acid.

4. The compound of claim 1 being the bis-(polyoxypolyethylhexityl) ester of 5,6,7,8,9,9-hexachloro-1,2,3,4,-4a,5,8,8a-octahydro-5,8-methano - 2,3 - naphthalene-dicarboxylic acid.

References Cited
UNITED STATES PATENTS

| | | | |
|---|---|---|---|
| 2,720,507 | 10/1955 | Caldwell | 260—75 |
| 3,057,824 | 10/1962 | Le Bras et al. | 260—75 |
| 3,105,087 | 9/1963 | Roberts et al. | 260—468 |
| 3,162,616 | 12/1964 | Dombrow et al. | 260—75 |
| 3,194,791 | 7/1965 | Wilson et al. | 260—75 |
| 3,208,939 | 9/1965 | Latos et al. | 260—514 XR |
| 3,236,814 | 2/1966 | Halmi et al. | 260—75 |
| 3,278,580 | 10/1966 | Worsley et al. | 260—468 |
| 3,288,813 | 11/1966 | Kleiman | 260—514 XR |

LORRAINE A. WEINBERGER, Primary Examiner

PAUL J. KILLOS, Assistant Examiner